United States Patent
Sobel et al.

(10) Patent No.: US 11,845,052 B2
(45) Date of Patent: *Dec. 19, 2023

(54) FLAVOR ENCAPSULATION USING ELECTROSTATIC ATOMIZATION

(71) Applicant: FONA TECHNOLOGIES, LLC, Geneva, IL (US)

(72) Inventors: Robert M. Sobel, Elburn, IL (US); Benjamin Bunchean, Streamwood, IL (US); Chin-Ping Su, Naperville, IL (US); Michael Gundlach, Santa Clara, CA (US); Thomas E. Ackerman, Jr., Francestown, NH (US); Glenn R. St. Peter, Atkinson, NH (US)

(73) Assignee: FONA TECHNOLOGIES, LLC, Geneva, IL (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/552,011

(22) Filed: Dec. 15, 2021

(65) Prior Publication Data

US 2022/0105485 A1  Apr. 7, 2022

Related U.S. Application Data

(63) Continuation of application No. 15/652,486, filed on Jul. 18, 2017, now Pat. No. 11,235,303, which is a continuation of application No. PCT/US2016/015136, filed on Jan. 27, 2016.

(60) Provisional application No. 62/108,904, filed on Jan. 28, 2015.

(51) Int. Cl.
| | |
|---|---|
| B01J 13/04 | (2006.01) |
| F26B 3/12 | (2006.01) |
| F26B 3/34 | (2006.01) |
| A23L 27/00 | (2016.01) |
| C11D 3/50 | (2006.01) |
| A23P 10/30 | (2016.01) |

(52) U.S. Cl.
CPC ............ *B01J 13/043* (2013.01); *A23L 27/72* (2016.08); *A23P 10/30* (2016.08); *C11D 3/505* (2013.01); *F26B 3/12* (2013.01); *F26B 3/34* (2013.01); *A23V 2002/00* (2013.01)

(58) Field of Classification Search
CPC ......... B01J 13/043; A23L 27/72; A23P 10/30; C11D 3/505; F26B 3/12; F26B 3/34; A23V 2002/00; B05B 5/03; B05B 5/0533
USPC ......................................................... 426/89
See application file for complete search history.

(56) References Cited

U.S. PATENT DOCUMENTS

| | | |
|---|---|---|
| 3,971,852 A | 7/1976 | Brennet et al. |
| 4,285,983 A | 8/1981 | Saldarini et al. |
| 4,303,582 A | 12/1981 | Shean |
| 4,368,100 A | 1/1983 | Pyves et al. |
| 4,824,026 A | 4/1989 | Tamura et al. |
| 4,842,203 A | 6/1989 | Kuhn et al. |
| 5,044,564 A | 9/1991 | Sickles |
| 5,124,162 A | 6/1992 | Boskovic et al. |
| 5,362,425 A | 11/1994 | Schrier |
| 5,730,912 A | 3/1998 | Redd et al. |
| 5,756,719 A | 5/1998 | Chaundy |
| 6,465,226 B1 | 10/2002 | Zimmermann |
| 6,608,017 B1 | 8/2003 | Dihora et al. |
| 7,022,352 B2 | 4/2006 | Castro et al. |
| 7,431,986 B2 | 10/2008 | Van Lengerich et al. |
| 8,569,028 B2 | 10/2013 | Jin et al. |
| 8,939,388 B1 | 1/2015 | Beetz et al. |
| 9,332,776 B1 | 5/2016 | Beetz et al. |
| 9,551,527 B2 | 1/2017 | Beetz et al. |
| 2004/0043043 A1 | 3/2004 | Schlyter |
| 2004/0081735 A1 | 4/2004 | Schleifenbaum et al. |
| 2008/0015264 A1 | 1/2008 | Schleifenbaum et al. |
| 2009/0047434 A1 | 2/2009 | Trophardy |
| 2009/0048206 A1 | 2/2009 | Watanabe et al. |

(Continued)

FOREIGN PATENT DOCUMENTS

| | | |
|---|---|---|
| EP | 0486198 | 5/1992 |
| EP | 0530277 | 3/1993 |
| WO | 0066256 | 11/2000 |

(Continued)

OTHER PUBLICATIONS

European Patent Office, Notice of Opposition, Application No. 16744037.9, dated Feb. 9, 2021, 14 pages.

(Continued)

*Primary Examiner* — Donald R Spamer
*Assistant Examiner* — Bhaskar Mukhopadhyay
(74) *Attorney, Agent, or Firm* — McAndrews, Held & Malloy, Ltd.

(57) ABSTRACT

Disclosed is an electrostatic spray drying process for encapsulating a core material, such as a volatile flavor oil, within a carrier or wall material. The process is achieved by atomizing a liquid emulsion comprising the core material and the wall material, applying an electrostatic charge at the site of atomization, and drying the atomized emulsion into an encapsulated, free-flowing powder. Applying an electrostatic charge at the site of atomization allows the spray drying to be accomplished at significantly reduced temperatures, in particular, inlet temperatures in the range of 25° C. to 110° C., and outlet temperatures in the range of 25° C. to 80° C. The low drying temperatures impart improvements in the resulting encapsulated powdered product, including better retention of volatile flavor components, a flavor profile comparable to that of the starting liquid formulation, and better hydration and dissolution in water-based applications.

18 Claims, 4 Drawing Sheets

(56) References Cited

U.S. PATENT DOCUMENTS

2011/0081320 A1    4/2011    Westall et al.

FOREIGN PATENT DOCUMENTS

| WO | 0202245    | 1/2002  |
|----|------------|---------|
| WO | 2005099906 | 10/2005 |
| WO | 2006047453 | 5/2006  |
| WO | 2007038616 | 4/2007  |
| WO | 2016123224 | 8/2016  |

OTHER PUBLICATIONS

Reply to Notice of Opposition, Application No. 16744037.9, dated Jun. 21, 2021, 25 pages.

European Patent Office, Opponent's Response to Proprietor's submssion of Jun. 21, 2021, Application No. 16744037.9, dated Sep. 8, 2021, 16 pages.

European Patent Office, Summons to attend oral proceedings pursuant to Rule 115(1) EPC, Application No. 16744037.9, dated Oct. 28, 2021, 13 pages.

Reply to the Preliminary Opinion of the Opposition Division provided with the summons to Oral Proceeding pursuant to Rule 115(1) EPC dated Oct. 28, 2021, Application No. 16744037.9, dated Mar. 31, 2022, 7 pages.

European Patent Office, Letter from the opponent of Mar. 24, 2022, Oral Proceedings dated May 31, 2022, Application No. 16744037.9, dated Apr. 4, 2022, 14 pages.

European Patent Office, Decision revoking the European Patent (Art. 101(2) and 101(3)(b) EPC), Application No. 16744037.9, dated Feb. 21, 2023, 29 pages.

Potter, C; "An Improved Laboratory Apparatus for Applying Direct Sprays and Surface Films, with Data on the Electrostatic Charge on Atomized Spray Fluids," The Annals of Applied Biology, vol. 39, No. 1, Mar. 1952, 29 pages.

Islam et al., "The Effects of Different Atomizing Gases and Drying Media on the Crystallization Behavior of Spray-Dried Powders," International Journal of Drying Technology, vol. 28, Sep. 15, 2010, 5 pages.

Europe Patent Office, Extended European Search Report, Application No. 19207203.1, dated Feb. 28, 2020, 5 pages.

Murtomaa et al., "Static electrification of powders during spray drying," Journal of Electrostatics, vol. 62, 2004, 10 pages.

Jain et al., "Spray Drying in Pharmaceutical Industry: A Review," Research J. Pharma. Dosage Forms and Tech. 2011, 6 pages.

Intellectual Property India, Examination Report, Application No. 201747026302, dated Oct. 31, 2019, 7 pages.

Europe Patent Office, Extended European Search Report, Application No. 16744037.9, dated Sep. 2, 2018, 8 pages.

Reineccius et al., "Developments in Gum Acacias for the Encapsulation of Flavors," Chapter 14 of ACS Symposium Series, vol. 590, American Chemical Society, 1995, 5 pages.

Johnson, et al., "Electrostatic-Enhanced Atomization for Spray Drying of Milk," Lebensm.-Wiss. u-Technol., vol. 29, 1996, 11 pages.

Yoshii et al., "Flavor release from spray-dried maltodextrin/gum arabic or soy matrices as a function of storage relative humidity," Innovative Food Science & Emerging Technologies, vol. 2, 2001, 7 pages.

Paramita et al., "Microencapsulation Efficacy of d-Limonene by Spray Drying Using Various Combinations of Wall Materials and Emulsifiers," Food Sci. Technol. Res., vol. 16, No. 5, 2010, 8 pages.

Apintanapong et al., "The use of spray drying to microencapsulate 2-acetyl-1pyrroline, a major flavour component of aromatic rice," International Journal of Food Science and Technology, vol. 38, 2003, 8 pages.

Soottitantawat et al.,"Influence of emulsion and powder size on the stability of encapsulated D-limonene by spray drying," Innovative Food Science and Emerging Technologies, vol. 6, 2005, 8 pages.

Baranauskiene et al., "Flavor Retention of Peppermint (*Mentha piperita* L.) Essential Oil Spray-Dried in Modified Starches during Encapsulation and Storage," Journal of Agricultural and Food Chemistry, vol. 55, 2007, 10 pages.

Gamero-Castano, "The structure of electrospray beams in vacuum," J. Fluid Mech. vol. 604, 2008, 30 pages.

Wu et al., "Electrohydrodynamic atomization: a versatile process for preparing materials for biomedical applications," J. Biomater. Sci. Polymer Edn., vol. 19 No. 5, 2008, 29 pages.

Wu et al., "Polymeric Particle Formation Through Electrospraying at Low Atmospheric Pressure," Wiley InterScience, Dec. 23, 2008, 7 pages.

Zhang et al., "Encapsulation of Living Cells in Small (~100 μm) Alginate Microcapsules bby Electrostatic Spraying: A Parametric Study," Journal of Biomechanical Engineering, vol. 131, Jul. 2009, 6 pages.

Bringas-Lantigua et al., "Influence of Spray-Dryer Air Temperatures on Encapsulated Mandarin Oil," Drying Technology, vol. 29, 2011, 8 pages.

Sansone et al., "Maltodextrin/pectin microparticles by spray drying as carrier for nutraceutical extracts," Journal of Food Engineering, vol. 105, 2011, 9 pages.

International Searching Authority, International Search Report and Written Opinion, Application No. PCT/US16/15136, dated Apr. 1, 2016, 8 pages.

FLAVOR ENCAPSULATION USING ELECTROSTATIC ATOMIZATION

CROSS-REFERENCE TO RELATED APPLICATIONS

This application is a continuation of U.S. patent application Ser. No. 15/652,486, filed Jul. 18, 2017, which is a continuation of and claims priority to PCT application No. PCT/US2016/015136, filed Jan. 27, 2016, which claims priority to U.S. Provisional Application No. 62/108,904, filed Jan. 28, 2015. The entire specification of the PCT and provisional applications referred to above are hereby incorporated by reference.

BACKGROUND OF THE INVENTION

The present technology relates to a process for encapsulating flavor components, or other components that are volatile, or heat or oxygen sensitive, using a spray drying process that employs electrostatic atomization. By mitigating problems associated with conventional high-temperature spray drying, the present technology produces a free-flowing, encapsulated powder that retains its original flavor profile. The present technology also relates to the encapsulated product resulting from the electrostatic atomization.

Spray drying systems have been widely utilized in the flavor industry to encapsulate flavor components, and to transform liquid flavoring ingredients into dry flowable powders. Encapsulation is a technique by which a material, or mixture of materials, is coated by another material, or mixture of materials. The coating material is also known as a wall material or a carrier. The wall material forms the outer layer or shell of the encapsulated product. The inner, coated material is known as a core. The spray dried product can be in the form of a core-shell, which contains a single core in the dried particle, or in the form of a matrix, which contains multiple cores in the particle. Since many of the flavor components are volatile and chemically unstable in the presence of heat, air, moisture, and/or light, encapsulating the flavor components in a wall material or carrier is a way to limit flavor degradation or loss during processing or storage. The encapsulation process usually requires a heat source to initiate a thermally induced phase separation. The phase separation results in the formation of a surface film or skin layer that permits water to selectively diffuse, while retaining the more volatile flavor components within the core of the encapsulated product.

One disadvantage of conventional spray drying systems for flavor encapsulation is the required use of heat energy to induce proper carrier film formation and dehydration in order to obtain a desirable, free-flowing encapsulated powdered product. Typical processing temperatures for conventional spray drying systems range from 150° C. to 210° C. for inlet temperatures and 60° C. to 120° C. for outlet temperatures. As a result of such high temperatures, the flavor profile of the dried encapsulated flavor may be significantly different from its original flavor profile, presenting a significant challenge in formulating an acceptable product from highly volatile flavor compounds and heat sensitive food ingredients. Further, the energy and time required to pre-condition the spray dryer to reach the set heating conditions can be costly and time-consuming.

To overcome at least some of the disadvantages resulting from the high temperatures used in spray drying systems, many in the flavor and food industry have developed specific wall materials or carriers to protect against volatilization of the flavor components. However, such wall materials or carriers may not be suitable for all types of flavor components. In addition, the use of specific wall materials does not address the energy requirements of conventional spray drying systems. Reducing the processing temperatures used in conventional spray drying systems is not a viable solution because, at lower inlet temperatures, such as 120° C., carrier film formation is slower, resulting in higher surface oil content and loss of flavor retention in the resulting product.

Therefore, a need remains for spray drying systems that mitigate the problems associated with conventional high temperature spray drying systems, while providing an encapsulated product that retains its original flavor profile. There is also a need for an encapsulated product that provides improvements in properties such as encapsulation efficiency and product flowability.

BRIEF SUMMARY OF THE INVENTION

One aspect of the present technology is an electrostatic spray drying process for preparing an encapsulated product, wherein the process facilitates the drying, or desolvating of water, by the application of an electrostatic field to convert a liquid emulsion to a free-flowing powder. By administering an electrostatic field at the site of atomization it is possible to reduce the amount of heat energy necessary to facilitate the conversion process of a liquid flavor or food ingredient into a free flowing powder. In one embodiment, the process comprises the steps of: forming an emulsion by emulsifying at least one core component with a solution or a suspension comprising water and at least one wall material; atomizing the emulsion into droplets in an electrostatic spray dryer and applying an electrostatic charge to the droplets in the range of about 0.5 kV to about 60 kV, alternatively about 5 kV to about 60 kV; and drying the droplets in the electrostatic spray dryer at an inlet temperature of about 25° C. to about 110° C. and an outlet temperature of about 25° C. to about 80° C. to obtain the encapsulated product.

In another aspect of the present technology, an inert gas can be used in the spray drying system to enhance the product quality attributes of the finished powders.

In a further aspect, the present technology provides an encapsulated product prepared by electrostatically spray drying a liquid emulsion comprising at least one core component and at least one wall material. The encapsulated product can have a core-shell structure or a matrix structure.

At least one aspect of the presently described technology provides encapsulated food and flavor products having improved quality characteristics, such as increased encapsulation efficiency (ingredient retention) and/or faster hydration in aqueous-based systems.

Further details and embodiments are disclosed in the discussion of the detailed description below.

DETAILED DESCRIPTION OF THE INVENTION

The presently described technology provides an improved spray drying method for preparing an encapsulated product comprising at least one core component and at least one carrier or wall material. The method comprises atomizing an emulsion formed from the core material and the carrier or wall material, and applying an electrostatic field at the site of the atomization. The electrostatic charge applied to the atomized emulsion facilitates film formation by the wall material, without the high heat typically required to induce film formation. As a result, the emulsion can be dried with mild or no heat being supplied to the drying chamber to produce an encapsulated spray-dried powder.

The encapsulated product of the present technology is prepared from a formulation comprising from 50% to 95%, alternatively from 60% to 85%, preferably from 75% to 85% by weight of at least one carrier or wall material, and from 5% to 50%, alternatively 15% to 40%, and preferably 15% to about 25%, by weight of at least one core material. The carrier or wall material is selected from a variety of materials or mixtures thereof, including carbohydrates, proteins, gums, lipids, waxes, food grade polymers, and cellulosic materials. Desirable wall materials should have GRAS (generally recognized as safe) status, have film-forming capacity, be capable of forming a stable emulsion with the core material, and be non-reactive with the core material.

Examples of suitable carbohydrates for use as a carrier or wall material include maltodextrin, chitosan, sucrose, glucose, lactose, dextran, corn syrup, cyclodextrin, isomalt, amylose, modified food starch, sugar-based material, sugar alcohol-based material, and mixtures thereof. Examples of suitable protein materials include gelatins, soy proteins, whey proteins, zein, casein, albumin, hemoglobin, peptides, gluten, and mixtures thereof. Examples of suitable gums include gum arabic, gum acacia, agar, sodium alginate, carrageenan, xanthan gum, and mixtures thereof. Examples of suitable cellulose materials include carboxymethyl cellulose, methyl cellulose, ethyl cellulose, nitrocellulose, acetylcellulose, cellulose acetate-phthalate, cellulose acetate-butyrate phthalate, and mixtures thereof. Selection of the carrier or wall material will depend upon the core material and the requirements for the encapsulated product.

The core material can include any natural or created flavor base oil, for example, citrus, spice, mint, berry, tropical fruit or savory types, or essential oils. The core material can also include individual components of any of the natural or created oils or flavors, such as, for example, benzaldehyde, isoamyl acetate, ethyl butyrate, linalool, methyl salicylate, limonene, menthol, decanol, diethyl phthalate, and citral. The base oil may contain several flavor/aroma compounds, depending on the type of flavor creation. The core material can also be other natural or synthetic materials that are employed in the food and drug industry for their aroma, flavoring, or medicinal properties. Such other materials include, for example, animal and/or vegetable oils, animal and/or vegetable protein, cocoa powder, vitamins, nutraceuticals, coloring agents, perfumes, and pharmaceutically or nutritionally acceptable salts.

The formulation may include one or more optional additives, such as, for example, emulsifiers, antioxidants, colorings, sweeteners, animal/vegetable oil, animal/vegetable protein, food acids, salts, diluents, flavor maskers, flavor enhancers, fillers, preservatives, fruit/vegetable extracts, stabilizers, lubricants, and the like. Such additives are known to one of skill in the art. Examples of emulsifiers that can be used include monoglycerides, mono- and diglyceride blends, propylene glycol monoglycerides, lecithin, modified lecithins, acetylated monoglycerides, lactylated fatty acid esters of glycerol and propylene glycol, lactylated propyleneglycol monoglycerides, sorbitan esters, sorbitan-polyoxyethylene [20] monoglycerides, polyglycerol esters, diacetyltartarate esters of monoglycerides (DATEMs), succinylated esters of monoglycerides, polyoxyethylenepropylene copolymers, ethylene oxide-propylene oxide copolymers, and mixtures thereof. Examples of suitable antioxidants include rosemary oil and Vitamin E. Typical amounts of additives, when employed, can range from about 0.1% to about 10% by weight for emulsifiers, from about 0.01% to about 5% by weight for antioxidants, and about 0.01% to about 10% for other additives.

The spray dry formulation is prepared by emulsifying together the wall material and the core material, and any optional components, to form an emulsion. Preferably, the wall material is pre-hydrated in water prior to the emulsification with the core material. The wall material can be supplied from the manufacturer in pre-hydrated form, or hydrated in water prior to use. Better flavor retention is achieved when the wall material is extensively solubilized and/or fully saturated prior to emulsification. The amount of water and hydration time needed to saturate the wall material will depend upon the type of wall material used in the formulation. For example, some starches may need to be hydrated overnight in order to avoid residual granules and fully perform the function of an interface between the water and flavor component (oil) in the emulsion. Preferably, sufficient water is used to form an aqueous solution or suspension of the wall material.

Emulsification of the core material with the pre-hydrated wall material can be accomplished by using a high shear mixer or a homogenizer. In general, higher shear rates tend to produce better, more homogenous emulsions having smaller micelles. Suitable devices for achieving a high shear rate include an HSM-100-LSK high shear mixer, available from Ross, operated for 5 to 20 minutes at 2,000 rpm to 10,000 rpm, or a homogenizer available from Nano Debee, operated at a pressure of 5,000 psi to 60,000 psi through 2 to 6 cycles. The specific equipment and operating conditions employed to obtain a liquid emulsion will depend, at least in part, upon the core and wall materials selected. The resulting emulsion has a viscosity suitable for pumping and atomizing the emulsion in a spray drying system. Optimum viscosities can range from about 50 cp to about 250 cp, alternatively 150 cp to about 250 cp, and in general, are obtained when the solids content, comprising the wall material, the core material, and any additives, ranges from about 15% to about 50% by weight of the emulsion, and the water content ranges from about 50% to about 85% by weight of the emulsion.

Once the emulsion of the core material and the wall material has been prepared, it is introduced into an electrostatic spray drying system, where the liquid emulsion is dried into a free-flowing powder of encapsulated core material. In general, the electrostatic spray drying system comprises an atomizing unit for atomizing the emulsion into droplets, and a drying unit connected to the atomizing unit, for drying the droplets into a powder.

The atomizing unit includes an electrostatic nozzle assembly that comprises a hollow conductive metal electrode terminating at its distal end in an electrode pin that projects from the center tip of the electrode. The electrode is connected at its proximal end to a high voltage source which supplies a voltage ranging from 0.5 kV to 60 kV, alternatively 5 kV to 60 kV, to the electrode. The atomizing unit includes an inlet port for pumping the liquid emulsion into the nozzle assembly. Any suitable pumping device can be used to pump the liquid emulsion through the emulsion inlet port into the nozzle assembly. The feed rate for introducing the liquid emulsion into the nozzle assembly will depend, at least in part, on the scale of the electrostatic spray drying system, and can range from about 5 ml/min to about 15 ml/min for bench scale operations, to about 500 ml/min to about 10,000 ml/min for production scale operations.

The atomizing unit also includes an inlet port for introducing an atomizing gas into the nozzle assembly. The atomizing gas can be delivered through the gas inlet port at a pressure of about 5 psi to about 120 psi, alternatively about 20 psi to about 80 psi, preferably about 40 psi to about 60 psi. The gas can be air, carbon dioxide, or an inert gas, such as nitrogen, argon, helium, xenon, krypton, or neon, although nitrogen is preferred. Use of an inert gas, such as nitrogen, as the atomizing gas also offers the benefit of reducing the concentration of oxidative by-products in the finished encapsulated powdered product that otherwise could occur if air were used as the atomizing gas. As a result, the encapsulated powdered product has better flavor and/or color due to lower concentrations of oxidative degradation products.

The atomizing gas carries the emulsion in co-current flow through the hollow electrode and over the center tip of the electrode. The emulsion becomes charged while going through the center electrode to the tip of the electrode due to the electrostatic charge being supplied by the high voltage source. The charged emulsion is atomized by the tangential shearing forces provided by the pressurized gas and sprayed into the drying unit. Without being bound by theory, it is believed that the electrostatic potential or charge applied to the emulsion at the site of atomization drives the core material into the center of the atomized droplet and facilitates film formation by the wall material at the droplet surface. Since film formation is accomplished through application of the electrostatic charge, the high temperatures required for proper film formation in conventional spray drying systems can be avoided, allowing significantly reduced drying temperatures to be used in the present system.

The drying unit comprises a drying chamber for drying the atomized emulsion droplets, and a product collection chamber connected to the drying chamber, for receiving the dried encapsulated product. Inside the dryer unit, the dryer inlet temperature can range from 25° C. to 110° C., and the dryer outlet temperature can range from 25° C. to 80° C. These temperatures are significantly lower than the processing temperatures of conventional spray drying systems. Air flowing within the dryer unit contacts the atomized droplets and evaporates the water. The air flow can be either co-current or counter-current to the flow of atomized droplets. The air flow will depend on the size of the drying unit, but can range from about 2.5 cfm to about 15 cfm or greater. For example, for a production scale drying unit, the air flow can be 100 cfm or greater, alternatively 150 cfm or greater, alternatively 175 cfm or greater, alternatively 250 cfm or greater. The dried, encapsulated product flows into the product collection chamber where it is then collected as a final product.

Because of the lower processing temperatures, the time required for pre-conditioning the spray dryer is reduced significantly to 5 to 15 minutes, and less energy consumption is required, depending on dryer capacity. A further advantage of the low processing temperatures is that the dried product remaining in the drying chamber has a quality comparable to that of the product collected from the product collection chamber. Consequently, the product in the drying chamber can also be collected, increasing the product yield to above 90%. In terms of product quality, the process provides superior retention of volatile flavor components, thus making the flavor profile of the product closer to that of the original created flavor formulation. The product of the present technology also has less surface oil than conventional spray dried products, which can lead to a more shelf-stable product since surface oil oxidation is minimized. In conventional spray dried products, surface oil content is typically 1% to 5%. The product of the present technology, however, is able to achieve a surface oil amount of less than about 1%, preferably less than about 0.5%, more preferably about 0.4% or less, based on the total weight of the product. In some embodiments, the product of the present technology has an amount of surface oil as low as 0.06% by weight. The process of the present technology also offers a product with less head-space aroma due to low surface flavors, thereby eliminating flavor cross-contamination.

The process of the present technology also allows spray dry products to be agglomerated, without the need to employ additional agglomeration techniques, such as fluid bed agglomeration, which can adversely affect retention of volatile flavor components in the resulting product. The powder product made with conventional spray dry processes normally offers particle sizes ranging from 50-250 μm. Powder products having such particle sizes often have poor solubility upon water reconstitution and cause a dustiness issue. Due to these challenges, conventional spray dry products are often agglomerated to increase the particle size thus improving their hydration property and resolving the dustiness issue. One standard agglomeration method is to utilize a fluidized bed spray coater. Inside the fluidized bed spray coater, spray dried particles are first fluidized with a circulated air stream followed by spraying additional binding solution onto particles. With the contact between particles and binding solution, a liquid bridge is formed and allows particles to stick to each other. The agglomerated particles are formed when the liquid is evaporated. This additional process is time consuming, increases cost, and potentially causes flavor loss due to the significant heat that dries the binding solution.

By contrast, the process of the present technology is a one step process that allows encapsulated flavor particles to bind with each other before they are completely dry. During the electrostatic spray dry process, the surfaces of the partially dry particles are sticky, which enables particles to firmly attach onto other particles to form a larger granulate. As soon as the water is fully evaporated, a larger dry solid granulate with a particle size ranging from greater than 125 μm to less than 450 μm is formed, resulting in a structure composed of several encapsulated particles aggregated with each other. In general, particle sizes for the spray dry products of the present technology range from less than about 45 μm to about 850 μm, alternatively from about 80 μm to about 600 μm, with the majority of the particle sizes preferably being greater than 125 μm. Products having such particle sizes provide superior instant hydration properties in water-based applications compared to the hydration properties of conventional spray dried products. In addition, the larger particle sizes achieved by the present technology can potentially resolve dusting issues that can occur with smaller particle sizes. The process of the present technology therefore provides an efficient, cost-effective, one-step process that overcomes the problems of poor solubility and dustiness that occur with conventional spray dry products, without the need for further granulation processes that can potentially cause flavor loss.

The preceding embodiments are illustrated by the following examples, which are not to be construed as limiting the invention or scope of the specific procedures or formulations described herein. One skilled in the art will recognize that modifications may be made in the presently described technology without deviating from the spirit or scope of the invention.

Examples 1 and 2

Materials and Methods:

An example formulation was prepared to evaluate the effects of the low temperature spray dry process of the present technology compared to a conventional, high temperature spray dry process. The formulation contained 80 parts by weight of OSAN-starch (Hi-Cap™100, National starch and Chemical Co.) as the wall material, and 20 parts by weight of orange oil (Orange Oil C.P. VALENCIA FCC, CITRUS AND ALLIED ESSENCES) as the core material. An emulsion was prepared by emulsifying the orange oil with pre-hydrated OSAN-starch (Hi-Cap™100) by using a high shear mixer (Charles Ross & Son company, Model: HSM-100LSK, Ser #: 205756) at 5,000 rpm for 5 minutes.

Sample Made by Conventional Spray Dry (Control Sample 1)

The emulsion made by the process as described above was sprayed into a mini spray dryer using nitrogen gas as the delivery gas (Büchi® Mini Spray Dryer, B-290, Switzerland) with emulsion feed rate at 15 ml/minute, air pressure at 50 psi and airflow rate at 5.6 cfm. The dryer temperature was set at 190° C. for the inlet and 90° C. for the outlet. The product was collected as a free-flowing dry powder from the product collector for further evaluation.

Sample Made by the Present Technology (Examples 1 & 2)

The emulsion made by the process described above was sprayed into a mini spray dryer (Büchi® Mini Spray Dryer, B-290, Switzerland) through an electrostatic nozzle with 20 Kilo-volt charged. The emulsion feeding rate was set at 10 ml/minute with air pressure at 50 psi and airflow rate at 5.6 cfm. The dryer temperature was set at 40° C. for the inlet and 40° C. for the outlet for Example 1, and 90° C. for the inlet and 50° C. for the outlet for Example 2. The final products were collected as a free-flowing dry powder from both the drying chamber and the product collector for further evaluation. The processing parameters are summarized in Table 1.

TABLE 1

| | Control 1 Processing parameter: | Example #1 | Example #2 |
| --- | --- | --- | --- |
| Spraying nozzle | Standard dual-fluid nozzle | Electrostatic spray nozzle with 20 kV charged | Electrostatic spray nozzle with 20 kV charged |
| Inlet temperature (° C.) | 190 | 40 | 90 |
| Outlet temperature (° C.) | 85-90 | 40 | 50 |
| Delivering gas | Nitrogen | Nitrogen | Nitrogen |
| Emulsion feeding rate (ml/min) | 15 | 10 | 10 |

TABLE 1-continued

| | Control 1 Processing parameter: | Example #1 | Example #2 |
| --- | --- | --- | --- |
| Visual appearance of final product | Free flowing powder | Free flowing powder | Free flowing powder |

The product quality was evaluated in total oil, surface oil, encapsulation efficiency, shelf-life stability, and head space odor analysis.

Total Oil Analysis:

The total oil content was determined by a Clevenger apparatus. 10.0 grams of product powder were dissolved in 150 ml of water in a 300 ml round bottom flask. An appropriate amount of boiling chips and antifoaming agent were added into the solution. The Clevenger apparatus was fitted onto the top of the flask with a water-cooled condenser device. The solution was hydro-distilled for 3 hours. The total oil content was calculated by the mass of recovered oil divided by the total sample mass, as shown in the following equation. Each example was performed in triplicate.

Total Oil (%)=(Recovered Orange Oil weight/Sample weight)×100(%)

Surface Oil Analysis:

The surface oil is determined by gravimetric mean. The dry powder sample (10 g) was mixed with 150 ml n-pentane for 4 hours. The surface oil will be extracted in the solvent phase. The solvent was separated from the dry powder by filtration and dried by nitrogen gas in a flask. The amount of surface oil was determined by the flask weight (after solvent evaporation) minus the original weight of the flask as shown in the following equation. Each example was performed in triplicate.

Surface Oil (%) = (Container wt. after pentane evaporation − container wt./Sample weight) × 100 (%)

Encapsulation Efficiency:

Encapsulation efficiency is calculated by using the following equation:

$$\text{Encapsultaion Efficiency} (\%) = \frac{\text{Total Oil Content (per g of sample)} - \text{Surface Oil Content (per g of } sampl\text{)}}{\text{Original Oil Wt/Carrier Wt}}$$

Each example was performed in triplicate.

Quantification of Major Flavor Components:

The sample (10 g) was hydrated in 100 ml deionized water until it was fully dissolved. Flavors were extracted with a liquid-liquid extraction method by mixing 10 ml of solvent each time (DCM) for a total of 6 times with the previously hydrated sample. The solvent phase was separated from the liquid sample and collected in a total of 60 ml. The solvent phase was then concentrated to 0.5 ml with slow nitrogen sparging. 1 μl of extraction was injected into a GC-MS to identify and quantify the target flavor components including limonene, myrcene, and sabinene. The original emulsion that was utilized for the process was selected as a control sample to understand the change of the ratio of each flavor component after each process.

Shelf Life Analysis:

Sample products were stored in 2 ml GC vials with the screw cap sealed properly. Samples were stored in an incubator at 40° C. for 14, 28 and 56 days separately. The samples were withdrawn on the day and stored at 4° C. until analysis. The sample (0.15 g) was measured and hydrated with water (0.85 g) with continuous agitation until fully dissolved. After that, 4 ml of acetone solution containing 0.25 mg/ml undecane were added into the fully-hydrated sample with continuous agitation for 10 minutes. The sample was allowed to settle and then filtered. The clear extraction (1 µl) is injected into the GC to identify and quantify the target components limonene and derivative oxidation components limonene oxide.

Head Space Odor Analysis:

The samples (0.2 g) were stored in GC vials and conditioned for 24 hours at room temperature. The headspace air was taken and injected into the GC to identify and quantify the target aroma component limonene.

Results:

Total Oil/Surface Oil/Encapsulation Efficiency

Products produced with the electrostatic spray nozzle at inlet temperatures of 40° C. (Example 1) and 90° C. (Example 2) both presented in a free-flowing dry powder form and provided total oil, surface oil, and encapsulation performance similar to the conventional spray dry control example. The samples produced by the process of the present technology (Examples 1 and 2) provided better encapsulation efficiency than the control sample.

TABLE 2

Total oil and encapsulation efficiency for control sample and Example 1 and Example 2

|  | Total oil (%) | Surface oil (%) | Encapsulation Efficiency (%) |
| --- | --- | --- | --- |
| Control 1 | 18.5 | 0.07 | 92.3 |
| Example 1 | 18.6 | 0.05 | 92.8 |
| Example 2 | 18.7 | 0.05 | 93.4 |

Quantification of Major Flavor Components

The samples produced with the electrostatic spray nozzle at inlet temperatures of 40° C. (Example 1), 90° C. (Example 2) and the control sample were compared with the emulsion that was used to create the samples above in terms of concentration of the major flavor components. Compared to the control sample, the products made by the process of the present technology (Example 1 and Example 2) had component concentrations that were closer to the emulsion component concentrations. This shows that the process of the present technology provides better volatile retention efficiency compared to the conventional spray drying process.

TABLE 3

Concentration (ppm) of target components (Limonene, Myrcene, and Sabinene) in the samples

| | Concentration in flavors (ppm) | | | |
| --- | --- | --- | --- | --- |
|  | Emulsion | Control 1 | Example 1 | Example 2 |
| Limonene | $8.65 \times 10^5$ | $6.69 \times 10^5$ | $6.79 \times 10^5$ | $7.31. \times 10^5$ |
| Myrcene | $2.13 \times 10^4$ | $1.19 \times 10^4$ | $1.29 \times 10^4$ | $1.46 \times 10^4$ |
| Sabinene | $4.68 \times 10^3$ | $3.53 \times 10^3$ | $3.93 \times 10^3$ | $4.26 \times 10^3$ |

Shelf-Life Analysis

TABLE 4

Concentration of limonene oxide (ppm) in the overall flavor sample

| | Limonene oxide in sample (ppm) | | |
| --- | --- | --- | --- |
| Days | Control 1 | Example 1 | Example 2 |
| 0 | $1.89 \times 10^4$ | $3.65 \times 10^3$ | $1.15 \times 10^3$ |
| 14 | $1.56 \times 10^4$ | $3.79 \times 10^3$ | $9.07 \times 10^3$ |
| 28 | $2.26 \times 10^4$ | $2.22 \times 10^3$ | $1.18 \times 10^4$ |
| 56 | $2.74 \times 10^4$ | $7.83 \times 10^2$ | $6.85 \times 10^3$ |

The products made with the electrostatic spray nozzle at inlet temperatures of 40° C. and 90° C. (Examples 1 and 2) showed lower concentrations of oxidation components than the control sample throughout the 14, 28 and 56 day time-period at 40° C. in the incubator.

Headspace Odor Analysis

TABLE 5

Concentration of limonene detected in the headspace

|  | Concentration of Limonene (ppm) |
| --- | --- |
| Control 1 | $3.62 \times 10^2$ |
| Example 1 | $1.22 \times 10^2$ |
| Example 2 | $9.64 \times 10$ |

The electrostatic spray dry process resulted in products yielding less headspace aroma in terms of limonene than the control sample.

Examples 3-4

Materials and Methods:

The electrostatic spray dry process was applied to different encapsulation materials (gum acacia, Instant gum, Alland & Robert, France) instead of the OSA-starch used in Example 1 and Example 2. The formulation contained 80 parts of gum acacia, as the wall material, and 20 parts of orange oil (Orange Oil C.P. VALENCIA FCC, CITRUS AND ALLIED ESSENCES) as the core material. The emulsion was prepared by the method described above. The conventional spray dry sample (Control sample 2) was made by the same process as Control sample 1 as described previously. The process utilized to prepare Example 1 and Example 2 was utilized to prepare Example 3 (at 40° C.) and Example 4 (at 90° C.).

TABLE 6

Processing Parameter and Observation:

|  | Control #2 | Example #3 | Example #4 |
| --- | --- | --- | --- |
| Processing parameters: | | | |
| Encapsulation Material | Gum acacia (Instant gum) | Gum acacia (Instant gum) | Gum acacia (Instant gum) |
| Flavor Material | 1-fold orange oil | 1-fold orange oil | 1-fold orange oil |
| Spraying nozzle | Standard dual-fluid nozzle | Electrostatic spray nozzle with 20 kV charged | Electrostatic spray nozzle with 20 kV charged |
| Inlet temperature (° C.) | 190 | 40 | 90 |

TABLE 6-continued

Processing Parameter and Observation:

| | Control #2 | Example #3 | Example #4 |
|---|---|---|---|
| Processing parameters: | | | |
| Outlet temperature (° C.) | 85-90 | 40 | 50 |
| Delivering gas | Nitrogen | Nitrogen | Nitrogen |
| Emulsion feeding rate (ml/min) | 15 | 10 | 10 |
| Visual appearance of final product | Free flowing powder | Free flowing powder | Free flowing powder |

The samples produced using the electrostatic spray nozzle with gum acacia at inlet temperatures of 40° C. (Example 3) and 90° C. (Example 4) both resulted in a free-flowing dry powder.

In terms of total oil loading and encapsulation efficiency as shown in Table 7, both the Example 3 and Example 4 samples showed higher total oil loading, lower surface oil content, and better encapsulation efficiency than the control sample.

TABLE 7

Total oil and encapsulation efficiency for Control sample 2, Example 3 and Example 4.

| | Total oil (%) | Surface Oil (%) | Encapsulation Efficiency (%) |
|---|---|---|---|
| Control 2 | 15.9 | 0.34 | 77.6 |
| Example 3 | 16.3 | 0.03 | 81.2 |
| Example 4 | 16.9 | 0.05 | 84.3 |

In terms of shelf-life stability, less oxidation component (limonene oxide) was observed in the samples made by the process of the present technology, Example 3 and Example 4, compared to Control sample 2, as shown in Table 8 throughout the 14, 28 and 56 day time-period at 40° C. in the incubator.

TABLE 8

Concentration of limonene oxide (ppm) in the flavor samples, Control 2, Example 3 and Example 4.

| | Limonene oxide in sample (ppm) | | |
|---|---|---|---|
| Days | Control 2 | Example 3 | Example 4 |
| 0 | Below detection limit | Below detection limit | Below detection limit |
| 14 | $7.27 \times 10^2$ | $4.78 \times 10^2$ | $5.35 \times 10^2$ |
| 28 | $3.78 \times 10^3$ | $2.20 \times 10^3$ | $1.19 \times 10^3$ |
| 56 | $6.93 \times 10^3$ | $3.07 \times 10^3$ | $3.43 \times 10^3$ |

Example 5

The electrostatic spray dry process was utilized with the same OSA-starch formulation used in Example 1 and Example 2, except the processing temperature was set at 25° C. for the inlet temperature and 25° C. for the outlet temperature. The other process parameters were the same as previous Examples. The finished sample was collected as a free-flowing dry powder.

Result and Observation

The hydration property was investigated using the Example 5 product and the Control sample 1 product. A 10 g sample of each product was introduced into 100 ml water (temperature at 25° C.) with continuous agitation at 250 rpm with a stir bar. The dissolving property was monitored. The Example 5 product provided faster hydration compared to the control sample, and no particles were observed floating on the surface after 30 seconds of stirring. In contrast, the Control sample 1 product was slow to hydrate, and still had significant product floating on the surface after 30 seconds of stirring.

Example 6

Materials and Methods:

In this Example, an encapsulated product was produced using the same electrostatic nozzle as Example 1 fitted onto a pilot scale spray dry unit (Prototype pilot spray dryer, Fluid Air—A Division of Spraying Systems Co., USA). The sample formulation was prepared using the same process as Example 1, and contained 80 parts by weight of OSAN-starch (HI-CAP® 100, National Starch and Chemical Co.) as the wall material, and 20 parts by weight of orange oil (Orange Oil C.P. VALENCIA FCC, CITRUS AND ALLIED ESSENCES) as the core material. The emulsion was prepared by emulsifying the orange oil with pre-hydrated OSAN-starch (HI-CAP® 100) using a high shear mixer (Charles Ross & Son Company, Model: HSM-100LSK, Serial #: 205756) at 5,000 rpm for 5 minutes. After high shear mixing, the mixture was homogenized using a homogenizer (Gaulin Corporation, high pressure homogenizer, Type: 405M3 3TPS, Serial #: 8818678) with first pass at 3,000 psi and second pass at 500 psi.

The resulting emulsion was sprayed through the electrostatic nozzle with the charged voltage switching from 22.5 Kilo-volt to 0.5 Kilo-volt every 3 seconds. The emulsion feed rate was set at 0.27 lbs/min with air pressure at 25 psi, airflow at 150 scfm, drying air temperature at 90° C., and atomizing gas heated to a temperature of 60° C. The processing parameters are summarized in Table 9.

TABLE 9

| | Example 6 |
|---|---|
| Spraying nozzle | Electrostatic spray nozzle with 0.5-22.5 kV charged |
| Inlet temperature (° C.) | 90 |
| Atomizing gas temperature (° C.) | 60 |
| Outlet temperature (° C.) | 50 |
| Delivering gas/Atomizing gas | Nitrogen |
| Emulsion feeding rate (lbs/min) | 0.27 |
| Airflow (scfm) | 150 |
| Atomizing gas pressure (psi) | 25 |

The product quality was evaluated with respect to finished product total oil, surface oil and encapsulation efficiency using the same test method described previously. The product surface morphology and particle structure was inspected by using a scanning electron microscope (SEM). The particle size distribution was measured by using U.S. Standard Test Sieve, #20 (850 μm), #40 (425 μm), #60 (250 μm), #80 (180 μm), #120 (125 μm), #200 (75 μm) and #325 (45 μm) (Cole-Farmer®, USA) to sort the product in terms of particle size. The product (50 g) was measured and added onto the stacked sieves (in ascending order). The sieves containing sample were then placed onto a Ro-tap for 5 minutes (W.S. Tyler, Ro-tap, Model RX-29, Serial #: 10-4104) to facilitate particle separation within the sieves. The weight of the remaining products on each sieve was measured and the particle size distribution percentage (%) was calculated by taking the mass of the remaining product on each sieve divided by the total mass of the added sample as shown in the following equation:

$$\text{Particle size distribution (\%)} = \\ \text{(Remaining sample weight on each sieve/Total sample weight)} \times \\ 100\ (\%)$$

Results:

Total Oil/Surface Oil/Encapsulation Efficiency

The results of total oil, surface oil and encapsulation efficiency of the Example 6 sample were compared against Control Sample 1, and are shown in Table 10. The Example 6 sample produced by the electrostatic spray dry unit provided higher flavor loading, as measured by total oil content, and had better encapsulation efficiency than the traditional spray drying process (Control Sample 1).

TABLE 10

Comparison of total oil, surface oil and encapsulation efficiency of control sample 1 and Example 6.

|  | Total Oil (%) | Surface Oil (%) | Encapsulation Efficiency (%) |
| --- | --- | --- | --- |
| Control 1 | 18.5 | 0.07 | 92.3 |
| Example 6 | 19.1 | 0.09 | 95.2 |

Surface Morphology and Particle Structure

Figure 1A:
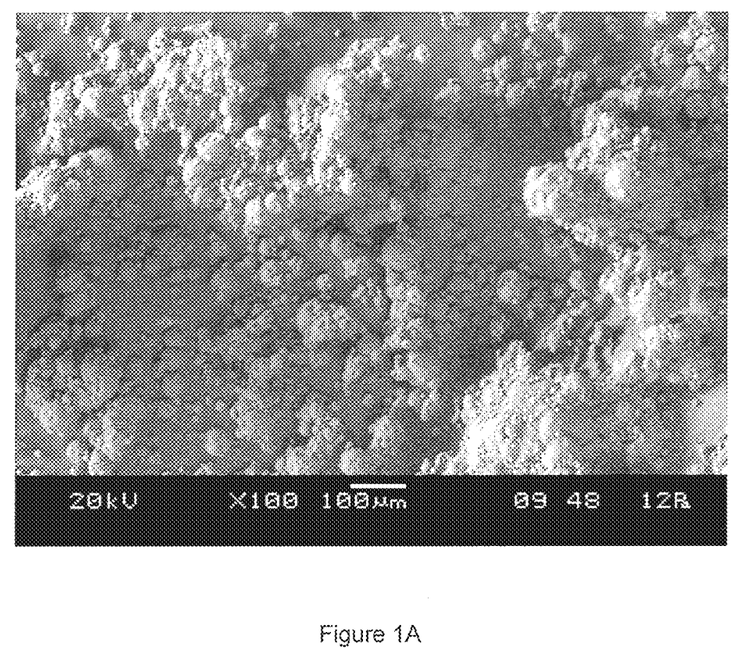
FIG. 1A and FIG. 1B are SEM photographs showing the morphological characteristics of the encapsulated product made by the disclosed electrostatic atomization process.
Figure 1B:
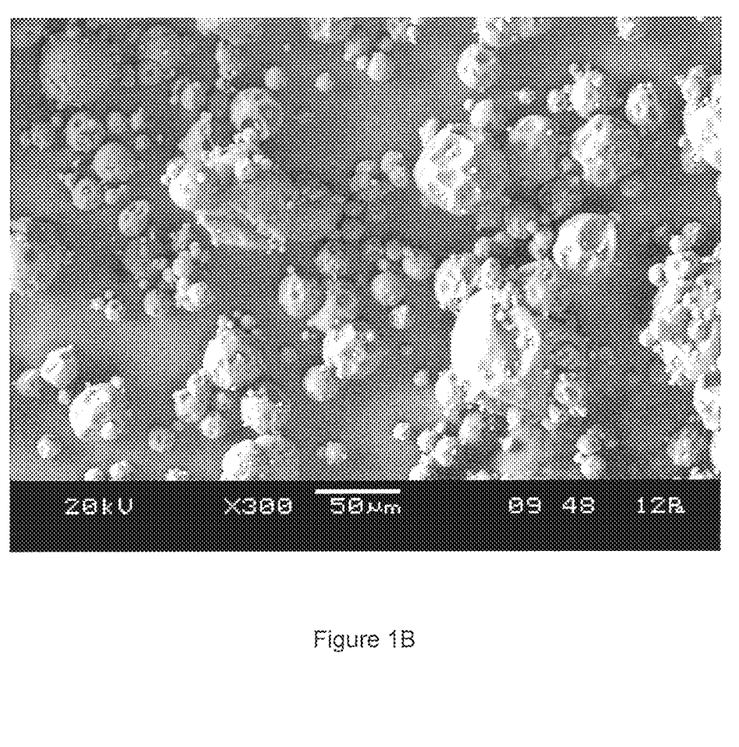

The sample surface morphology and particle structure was inspected by scanning electron microscope (SEM). The images representing morphological characteristics of the Example 6 product are shown in FIG. 1A and FIG. 1B. From FIG. 1A and FIG. 1B, it can be seen that the product prepared by the process of the present technology resulted in larger granulated particles with multiple particles sticking with each other.

Particle Size Distribution

The particle size distribution of Example 6 was found to increase significantly compared to the Control Sample 1. As shown in Table 11, the product produced by the present technology resulted in a product having 68.7% of the sample particles larger than 125 µm compared with the Control sample 1 product which resulted in only 10.6% of the sample particles being larger than 125 µm.

TABLE 11

Particle size distribution (%) of the Control Sample 1 and Example 6.

| Particle size distribution (%) within different particle range | Control Sample 1 | Example 6 |
| --- | --- | --- |
| >850 µm | 0% | 1.6% |
| >425 µm | 0.7% | 19.1% |
| >250 µm | 1.5% | 21.1% |
| >180 µm | 0.6% | 11.8% |
| >125 µm | 7.8% | 15.1% |
| >75 µm | 52.2% | 12.4% |
| >45 µm | 23.9% | 14.7% |
| <45 µm | 13.3% | 4.2% |
| Sum of the particles >125 µm | 10.6% | 68.7% |

Example 7

Materials and Methods:

The Example 7 formulation was prepared using the same process steps as Example 6, except Strawberry liquid flavor (FONA Strawberry base, Natural, WONF, 11712A WC1) was used instead of the orange oil as the core material. The formulation contained 80 parts by weight of OSAN-starch (HI-CAP®100, National Starch and Chemical Co.) as the wall material, and 20 parts by weight of the strawberry liquid flavor. A Control Sample 3 was prepared using a conventional spray drying process as previously described for Control Sample 1. The samples were evaluated with respect to total oil, surface oil, and hydration property. The total oil, surface oil and encapsulation efficiency were measured using the same methods as previously described. To understand the hydration property, the prepared dry encapsulated flavor samples (Control Sample 3 and Example 7), 0.2% by weight, were introduced into still water. The hydration property was investigated and recorded using a high resolution camera in the format of videos and images.

Total Oil/Surface Oil

The results of the total oil, surface oil and encapsulation efficiency for Control sample 3 and Example 7 are shown in Table 12. Comparing the results, it can be seen that the Example 7 product, made according to the present technology had significantly higher flavor loading, as measured by total oil content, compared to the Control Sample 3 product.

TABLE 12

Comparison of total oil, surface oil and encapsulation efficiency of Control Sample 3 and Example 7

|  | Total oil (%) | Surface oil (%) | Encapsulated Efficiency (%) |
| --- | --- | --- | --- |
| Control 3 | 1.4 | 0.05 | 6.75 |
| Example 7 | 3.5 | 0.01 | 17.45 |

Hydration Property

Figure 2:
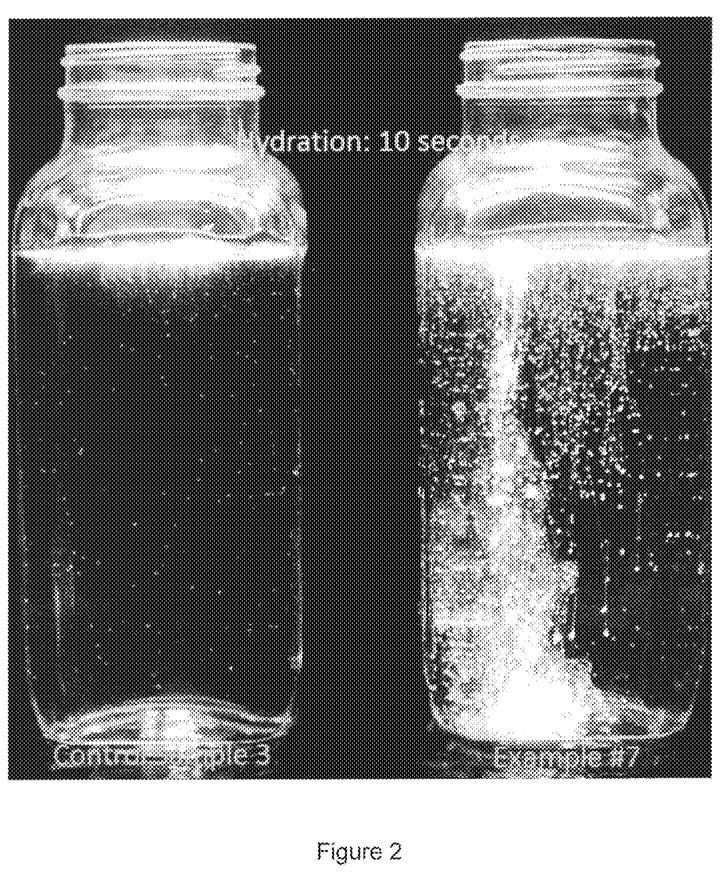
FIG. 2 is a photograph comparing the hydration properties of an encapsulated product made by the disclosed electrostatic atomization process with an encapsulated product made by a conventional spray drying process, after 10 seconds of hydration.
Figure 3:
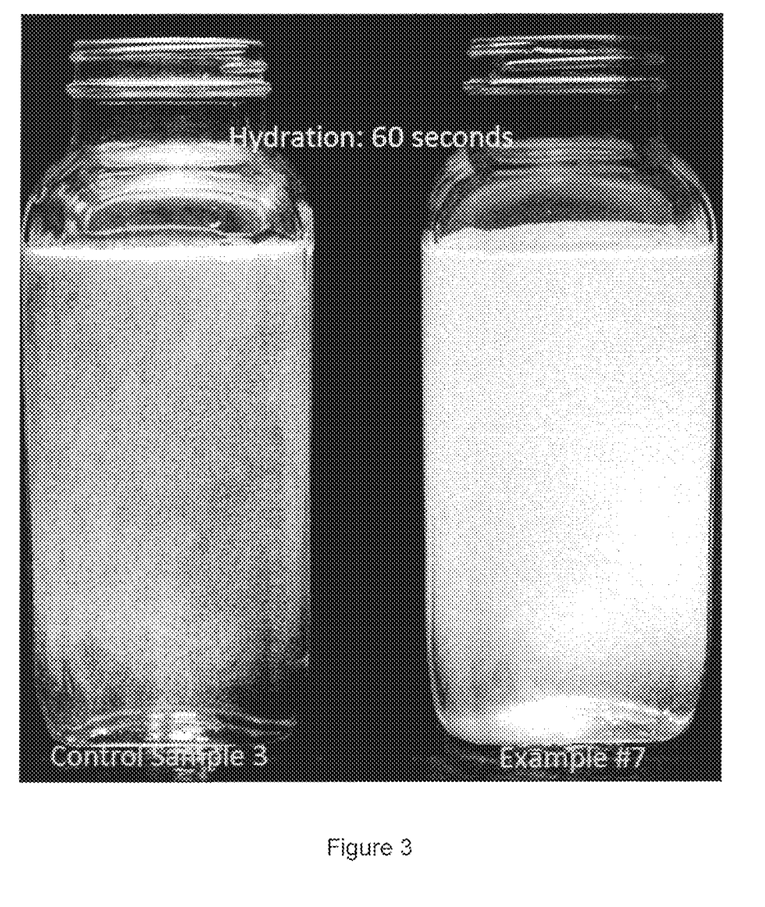
FIG. 3 is a photograph of the same products shown in FIG. 2, at 60 seconds of hydration.

The hydration properties of Control Sample 3 and Example 7 at 10 seconds and 60 seconds are presented in FIG. 2 and FIG. 3, respectively. The Example 7 sample prepared according to the present technology showed significantly faster hydration, with more powder dissolving into water after 10 seconds of hydration (as shown in FIG. 2), than the sample made using a conventional spray drying process (Control Sample 3). As shown in FIG. 3, after 60 seconds of hydration, the Example 7 sample was fully dissolved and the water turned cloudy. In contrast, the sample made using a conventional spray drying process (Control 3) was not fully dissolved and the water only turned partially cloudy. It is believed that the quick hydration property of the Example 7 product results from the granulation phenomenon during the spray drying process of the present technology. The granulation that occurs during the presently described electrostatic spray drying process allows the particles to attach to each other, eventually forming larger granulates with a larger surface area.

The presently described technology and the manner and process of making and using it, are now described in such full, clear, concise and exact terms as to enable one of ordinary skill in the art to which the present technology pertains, to make and use the same. It should be understood that the foregoing describes some embodiments and advantages of the invention and that modifications may be made therein without departing from the spirit and scope of the presently described technology as set forth in the following claims.

The invention claimed is:

1. A method for preparing a granulated, encapsulated product comprising a plurality of bond particles, each particle comprising a core material encapsulated within a wall material, the method comprising the steps of:
   forming an emulsion by emulsifying at least one core material with a solution or a suspension comprising water and at least one wall material, wherein the resulting emulsion has a solids content of 15% to 50% by weight of the emulsion and a viscosity of about 150 cps to about 250 cps;
   introducing the emulsion into an atomizing unit of an electrostatic spray dryer;
   applying an electrostatic charge in the range of about 5 kV to about 60 kV to the emulsion in the atomizing unit;
   atomizing the emulsion into droplets with a gas pressurized at a pressure of 5 psi to 80 psi to obtain electrostatically charged emulsion droplets;
   drying the electrostatically charged emulsion droplets in the electrostatic spray dryer to effect binding of the electrostatically charged emulsion droplets at an inlet temperature of about 25° C. to about 110° C. and an outlet temperature of about 25° C. to about 80° C. to obtain the granulated, encapsulated product comprising the plurality of bound particles;
   wherein binding of the electrostatically charged emulsion droplets is achieved without the use of a fluidized bed or an added binding agent, and
   wherein binding of the electrostatically charged emulsion droplets results in a granulated, encapsulated product having a granulated morphology representative of the plurality of bound particles.

2. The method of claim 1, wherein the core material comprises 5% to 50% by weight, and the wall material comprises 50% to 95% by weight, based on the total dry weight of the core material and the wall material combined.

3. The method of claim 2, wherein the core material comprises a volatile oil.

4. The method of claim 1, wherein the core material comprises one or more flavor components.

5. The method of claim 1, wherein the emulsion is introduced into the electrostatic spray dryer at a feed rate of about 2 ml/min to about 10,000 ml/min.

6. The method of claim 1, wherein the gas is an inert gas.

7. The method of claim 1, wherein the electrostatically charged droplets are dried in the presence of a gas.

8. The method of claim 1, wherein the granulated, encapsulated product has particle sizes in the range of about 80 μm to about 600 μm.

9. The method of claim 1, wherein the wall material comprises at least one material selected from carbohydrates, proteins, gums, lipids, waxes, food grade polymers, and celluloses.

10. The method of claim 1, wherein the wall material is hydrated prior to emulsification with the core component.

11. The method of claim 1, wherein the gas is pressurized at a pressure of 5 psi to 60 psi.

12. The method of claim 1, wherein the method results in a product yield of greater than 90%.

13. A granulated, encapsulated product comprising a plurality of bound particles, each particle comprising a core material encapsulated within a wall material, wherein the encapsulated product is prepared by an electrostatic spray drying process according to claim 1.

14. The encapsulated product of claim 13, wherein the encapsulated product has a surface oil content of about 0.5% by weight or less based on the weight of the encapsulated product.

15. The encapsulated product of claim 13, wherein the core material comprises one or more flavor components.

16. The encapsulated product of claim 13, wherein the at least one wall material is selected from carbohydrates, proteins, gums, lipids, waxes, food grade polymers, and celluloses, wherein:
   the carbohydrates are selected from the group consisting of maltodextrin, chitosan, sucrose, glucose, lactose, dextran, corn syrup, cyclodextrin, isomalt, amylose, modified food starch, sugar-based material, and sugar alcohol-based material;
   the proteins are selected from the group consisting of gelatins, soy proteins, whey proteins, zein, casein, albumin, hemoglobin, and peptides;
   the gums are selected from the group consisting of gum arabic, gum acacia, agar, sodium alginate, carrageenan, and xanthan gum; and
   the celluloses are selected from the group consisting of carboxymethyl cellulose, methyl cellulose, ethyl cellulose, nitrocellulose, acetylcellulose, cellulose acetate-phthalate, and cellulose acetate-butyrate phthalate.

17. The encapsulated product of claim 13, wherein the encapsulated product has particle sizes in the range of about 80 μm to about 600 μm.

18. The encapsulated product of claim 17, wherein at least 50% of the particle sizes of the encapsulated product are greater than 125 μm.

* * * * *